United States Patent [19]
Andrews, Jr. et al.

[11] Patent Number: 5,805,635
[45] Date of Patent: Sep. 8, 1998

[54] SECURE COMMUNICATION SYSTEM

[75] Inventors: Daniel E. Andrews, Jr.; William E. Klund; Robert D. Isaak, all of San Diego, Calif.

[73] Assignee: The United States of America as represented by the Secretary of the Navy, Washington, D.C.

[21] Appl. No.: 352,687

[22] Filed: Mar. 17, 1964

[51] Int. Cl.$^6$ ........................................ H04B 1/69
[52] U.S. Cl. ................................. 375/209; 380/35
[58] Field of Search ......................... 178/122, 5.1, 6.8, 178/69.5; 179/1.5, 15; 325/32, 122; 340/100.7, 3 M; 375/209, 210; 380/35, 46, 48

[56] References Cited

U.S. PATENT DOCUMENTS

| | | | |
|---|---|---|---|
| 2,929,865 | 3/1960 | Jepmond | 380/19 |
| 3,099,796 | 7/1963 | Zadoff | 375/269 |
| 3,157,874 | 11/1964 | Altar et al. | 342/145 |

Primary Examiner—Gilberto Barron, Jr.
Attorney, Agent, or Firm—Harvey Fendelman; Michael A. Kagan; Paul N. Critchlow

[57] ABSTRACT

A secure communication system comprising:

a first cyclical pseudo-random noise generator comprising determinable variable starting point means and an output;

transmitting means for transmitting said pseudo-random noise generator output;

receiving means for receiving said transmitting means transmissions, said receiving means having an output;

recycling storage means for storing said receiving means output;

a second cyclical pseudo-random noise generator identical to said first pseudo-random noise generator having an output and a reset input, said receiving means output connected to said reset input;

a correlator having a first input connected to said storage means and a second input connected to said second pseudo-random noise generator output and an output from said correlator; and timing means connected to said receiving means output and said correlator output for measuring time elapsed between any output of said receiver and said correlator.

6 Claims, 1 Drawing Sheet

SECURE COMMUNICATION SYSTEM

The invention described herein may be manufactured and used by or for the Government of the United States of America for governmental purposes without the payment of any royalties thereon or therefor.

The present invention relates to a secure communications system and more particularly to a cryptographically secure communication system utilizing the regular echo transmission of an echo ranging equipment. According to the invention, a pseudo-random noise generator having a digitally generated output of a random but repeated pattern is transmitted as the regular transmission in the sonar echo-ranging equipment. The length of the pattern corresponds to the echo ranging pulse length but the starting point at the beginning of the echo ranging transmission with respect to some fiducial point in the pattern can be selected at will. The receiving station has a pseudo-random noise generator identical in both design and connection (i.e., having the same pattern or code of the day), to the one at the transmitter and therefore has the same sequential random output. This generator is started at a predetermined starting point upon reception of the leading edge of the transmitted signal. The received signal is also stored and repeated into a correlator along with the output from the receiving station pseudo-random noise generator. The correlator is designed to uniformly advance one signal with respect to the other until the received signal matches the locally generated one. When the two signals match, the correlator yields an output. At the receiving station a counter is started on reception of the leading edge of the received signal and the counter is stopped at the time the two signals match. The time between the start and stop signals to the counter is then an indication of the starting point of the pseudo-random noise generator at the transmitter which, in turn, can be interpreted as a predetermined message number.

The advantages of this type of system are numerous, the first and most obvious being high security of communication (i.e., it would not only be necessary to duplicate the entire receiving system, but it would also require the pseudo-random noise generator to be interconnected in the identical way, i.e., to have the code of the day). Since the only intelligence transmitted is a number, i.e., the time between start of the pulse and the comparison, in the absence of the predetermined message code this would yield nothing. Also the transmission appears to be a normal echo ranging transmission and hence would not arouse suspicion of carrying any further intelligence.

An object of the present invention is the provision of a secure communication system which utilizes pseudo-random noise transmissions to convey intelligence.

Another object is to provide a secure communication system which can be utilized simultaneously with an echo ranging system without impairing the quality for either purpose.

A further object of the invention is the provision of a secure communication system utilizing digital techniques and thereby requiring a minimum of maintenance and adjustment.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
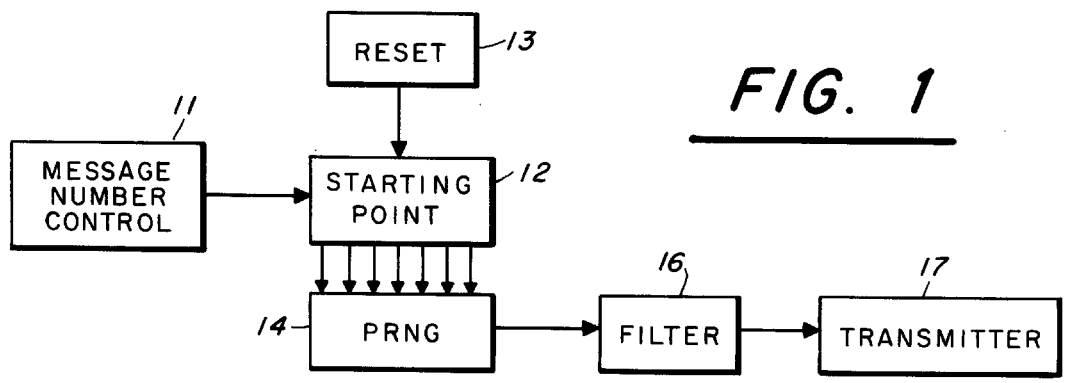
FIG. 1 is a block diagram of the transmitter portion of the present invention.

Referring to FIG. 1, message number control 11 is coupled to starting point network 12 which steers a reset control signal 13 to the appropriate individual stages of the shift register used to generate the digital sequence of the pseudo-random noise generator 14. The output of pseudo-random noise generator 14 is filtered in filter 16 and amplified and transmitted through transmitter 17.

Figure 2:
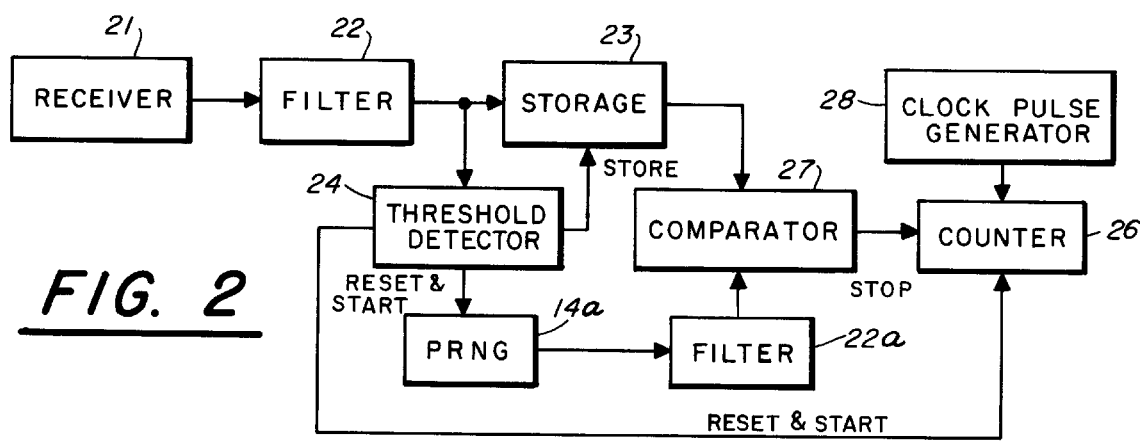
FIG. 2 is a block diagram of the general receiver system of the present invention.

Referring to FIG. 2, receiver 21 has an output which is filtered in filter 22 and connected to storage 23 and threshold detector 24. Threshold detector has a storage control output connected back to storage 23, a reset and starting output connected to the pseudo-random noise generator 14a, and a start and reset output to counter 26. The outputs of storage 23 and pseudo-random noise generator 14a filtered by filter 22a are connected each to an input of correlator 27. The output of correlator 27 supplies a stop signal to counter 26. Clock pulse generator 28 supplies the countable events to counter 26.

Referring to FIG. 3, receiver 21 again has an output filtered in filter 22 which is coupled to delay line time compressor 23a, hereinafter referred to as a "deltic", and threshold detector 24.

Threshold detector 24 has a storage control output connected to deltic 23a, a reset and start output to counter 26, and a reset and start output pseudo-random noise generator 14a. The output of pseudo-random noise generator 14a is coupled through filter 15 to an input of deltic 29. The outputs of deities 23a and 29 are each connected to an input of correlator 27a. The output of correlator 27a is passed through threshold detector 30, the output of which supplies a stop pulse to counter 26. Clock pulse generator 28 again supplies the countable events to the input of counter 26.

OPERATION

Referring back to FIG. 1, reset control 13 supplies a reset pulse to starting point matrix 12. Message number control 11 controls the steering of said reset pulse in starting point matrix 12 to the appropriate stages of pseudo-random noise generator 14 to cause it to be reset to some predetermined point in the pseudo-random noise generator cycle, the period of which is equal to the transmitted pulse length. The output of pseudo-random noise generator is then filtered by filter 16 and amplified and broadcast by transmitter 17. Each cycle of the signal that is broadcast will approximate a sine wave, but successive cycles will have variable axis cross-over points (i.e., the axis crossing intervals will differ) as determined by the output of pseudo-random noise generator 14.

Referring now to FIG. 2, the signal transmitted by transmitter 17 is received and amplified by receiver 21, filtered by filter 22 and applied to a storage means 23. At the same time the output of filter 22 is applied to threshold detector 24 which, on receipt of the leading edge of the received wave will supply a trigger, or store order to storage unit 23, and start signals to pseudo-random noise generator 14a and counter 26. The trigger applied to storage unit 23 starts storage unit 23 storing the signal from the output of filter 22. In the absence of such a signal, new information (or background noise) flows continuously into storage replacing the oldest previously held information which is then lost. The trigger applied to pseudo-random noise generator 14a resets pseudo-random noise generator 14a at a predetermined starting point in its cycle, the complete cycle waveform being the identical complete cycle waveform of pseudo-random noise generator 14 in FIG. 1. The output of pseudo-random noise generator 14a as filtered by filter 22a and the output of storage means 23 are then compared in correlator 27. The trigger or start signal from threshold detector 24 to counter 26 starts the said counter counting clock pulses from clock pulse generator 28. When the two signals applied to correlator 27 are sufficiently identical, an output pulse will appear to stop counter 26 from counting. This will happen at a predetermined time depending upon the starting point of pseudo-random noise generator 14. This time will be indicated by a definite count in counter 26 which, in turn, is a predetermined message number.

Figure 3:
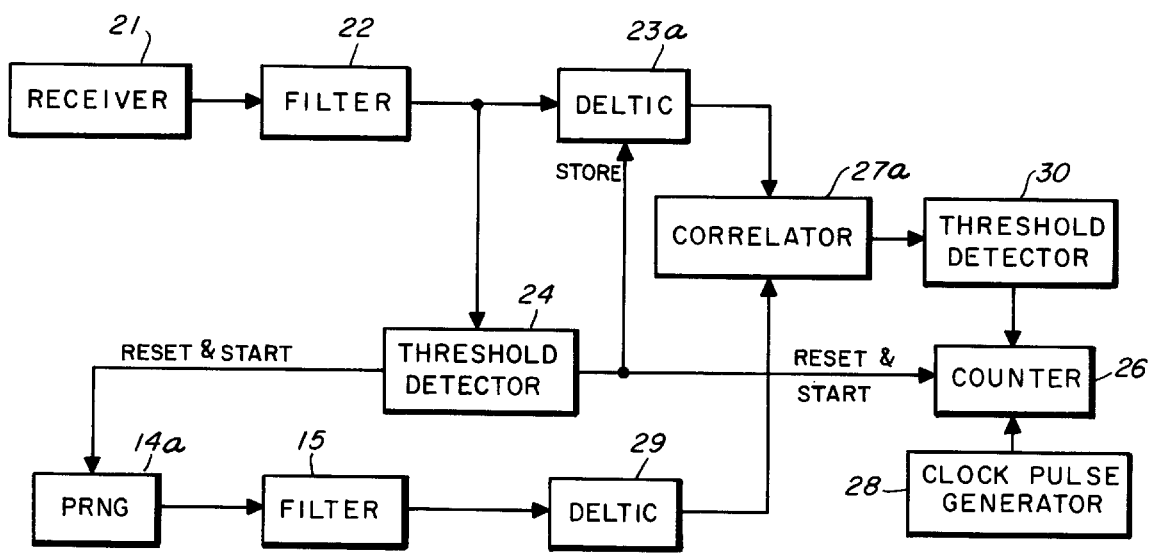
FIG. 3 is a block diagram of a particular embodiment of the receiver system of FIG. 2.

Referring to FIG. 3, another embodiment of the receiving system of FIG. 2 is shown. The receiver 21, filter 22, threshold detector 24, pseudo-random noise generator 14a, counter 26 and clock pulse generator 28 are all identical to the respective components of FIG. 2. Here, however, the storage means is shown as a deltic 23a such as that disclosed and claimed by Victor C. Anderson, U.S. Pat. No. 2,958,039. The deltic time compresses and stores the wave train from the output of filter 22 and cyclicly presents it to correlator 27a with a repetition period equal to the ratio of the original wave train length and the time compression factor of the deltic. Deltic 29 operates in a non-storing mode, time compressing the output of pseudo-random noise generator 14a as filtered in filter 15. Deltic 29 continuously presents its time compressed output to correlator 27a. When the outputs of the two deities are in correlation, correlator 27a produces an output pulse to threshold detector 30 and stops counter 26. Correlator 27a can be looked upon as a coincidence and summation network which sums a given number of sequential output pulses arising from the polarity coincidences of the outputs of deltic 23a and deltic 29 over a predetermined period of time. Hence the necessity for threshold detector 30, since an output not providing the desired recognition differential can be present from correlator 27a before best correlation is achieved.

It should be understood, of course, that the foregoing disclosure relates to only preferred embodiments of the invention and that it is intended to cover all changes and modifications of the examples of the invention herein chosen for the purposes of the disclosure which do not constitute departures from the spirit and scope of the invention.

What is claimed is:

1. A secure communication system comprising:
   a first cyclical pseudo-random noise generator comprising determinable variable starting point means and an output;
   transmitting means for transmitting said pseudo-random noise generator output;
   receiving means for receiving said transmitting means transmissions, said receiving means having an output;
   recycling storage means for storing said receiving means output;
   a second cyclical pseudo-random noise generator identical to said first pseudo-random noise generator having an output and a reset input, said receiving means output connected to said reset input;
   a correlator having a first input connected to said storage means and a second input connected to said second pseudo-random noise generator output and an output from said correlator; and
   is timing means connected to said receiving means output and said correlator output for measuring time elapsed between any output of said receiver and said correlator.

2. The secure communication system of claim 1 wherein said storage means comprises a deltic.

3. The secure communication system of claim 1 wherein said storage means comprises an incremental recirculating delay line.

4. The secure communication system of claim 1 further comprising a threshold detector coupled between said receiver output and said storage for triggering the start of storage of received signals.

5. The secure communication system of claim 1 and further including means for determining said variable starting point of said first pseudo-random noise generator connected to said first pseudo-random noise generator.

6. The secure communication system of claim 1 wherein said timing means comprises:
   a counter having a start input, a stop input, and a clock pulse input;
   said start input connected to said receiving means output;
   said stop input connected to said correlator output; and
   a clock pulse generator connected to said clock pulse input.

* * * * *